(12) United States Patent  
Morishima (10) Patent No.: US 7,447,137 B2  
(45) Date of Patent: *Nov. 4, 2008

(54) METHOD AND APPARATUS FOR CONTROLLING POWER DURING RECORDING OF A VISIBLE IMAGE IN AN OPTICAL STORAGE MEDIUM

(75) Inventor: Morito Morishima, Fukuroi (JP)

(73) Assignee: Yamaha Corporation, Hamamatsu-shi (JP)

( * ) Notice: Subject to any disclaimer, the term of this patent is extended or adjusted under 35 U.S.C. 154(b) by 39 days.

This patent is subject to a terminal disclaimer.

(21) Appl. No.: 11/247,845

(22) Filed: Oct. 11, 2005

(65) Prior Publication Data

US 2006/0028940 A1   Feb. 9, 2006

Related U.S. Application Data

(63) Continuation of application No. 10/609,285, filed on Jun. 27, 2003, now Pat. No. 6,982,943.

(30) Foreign Application Priority Data

Jun. 27, 2002   (JP) ............................. 2002-188168

(51) Int. Cl.  
G11B 7/00   (2006.01)

(52) U.S. Cl. .................. 369/116; 369/47.51; 369/53.28

(58) Field of Classification Search .................. None  
See application file for complete search history.

(56) References Cited

U.S. PATENT DOCUMENTS

| | | |
|---|---|---|
| 4,841,505 A | 6/1989 | Aoyagi |
| 5,737,289 A | 4/1998 | Udagawa |
| 5,818,801 A | 10/1998 | Watanabe et al. |
| 5,831,946 A * | 11/1998 | De Bie .................... 369/30.36 |
| 6,072,761 A | 6/2000 | Tani |
| 6,430,120 B1 * | 8/2002 | Chritz et al. ............. 369/30.12 |

(Continued)

FOREIGN PATENT DOCUMENTS

EP   1168316   1/2002

(Continued)

OTHER PUBLICATIONS

Information Recorder, Matsui Masakatsu (JP 2001-344756), Dec. 14, 2001, Abstract only.*

(Continued)

*Primary Examiner*—Tan X Dinh  
(74) *Attorney, Agent, or Firm*—Pillsbury Winthrop Shaw Pittman LLP (57) ABSTRACT

A controlling unit 130 of an optical disc recording apparatus judges a failure of a focus servo in accordance with an output signal of a servo circuit 107. When a failure of the focus servo is detected, a laser light irradiating position at the time of the failure is obtained as a standard position and a laser power controlling unit 140 is controlled to pause a control of the laser power based on data to be recorded. Thereafter, the laser power controlling unit 140 and a position of an optical pickup 103 are controlled to restart the control of the laser power based on the data to be recorded from the standard position as a starting position.

16 Claims, 8 Drawing Sheets

U.S. PATENT DOCUMENTS

| | | | |
|---|---|---|---|
| 6,930,964 B2 * | 8/2005 | Matsui | ............... 369/47.3 |
| 2002/0136129 A1 | 9/2002 | Kadlec et al. | |
| 2003/0231563 A1 | 12/2003 | Masaki | |
| 2004/0004912 A1 | 1/2004 | Morishima | |

FOREIGN PATENT DOCUMENTS

| | | |
|---|---|---|
| EP | 1 168 316 A2 | 2/2002 |
| JP | 58-100235 | 6/1983 |
| JP | 09-306144 | 11/1997 |
| JP | 2000-268362 | 9/2000 |
| JP | 2001-1344756 | 12/2001 |

OTHER PUBLICATIONS

Japanese Office Action (Notice of Reasons of Rejection) dated Dec. 1, 2005.

Japanese Office Action (Decision of Rejection) dated May 17, 2006.

\* cited by examiner

METHOD AND APPARATUS FOR CONTROLLING POWER DURING RECORDING OF A VISIBLE IMAGE IN AN OPTICAL STORAGE MEDIUM

RELATED APPLICATION DATA

This is a continuation of application Ser. No. 10/609,285, filed Jun. 27, 2003, now U.S. Pat. No. 6,982,943, which is based on Japanese Patent Application 2002-188168, filed Jun. 27, 2002.

BACKGROUND OF THE INVENTION

1. Field of the Invention

This invention relates to an optical disc recording apparatus.

2. Discussion of the Related Art

Conventionally, there is an optical disc recording apparatus for recording information on recordable optical discs such as a compact disc-recordable (CD-R) and a compact disc rewritable (CD-RW). The optical disc recording apparatus executes information recording by irradiating laser lights with difference in intensity corresponding to data to be recorded to change reflectivity of a recording layer. Then, the change of the reflectivity of this recording layer gives contrast on the recording surface. In recent years, a visible image has been recorded on the recording surface of the optical disc by using the contrast formed by the laser light.

In the optical disc recording apparatus, focus servo is executed for keeping a distance between a lens of an optical pickup and the optical disc constant. The focus servo may fail not only when there is adhesion of crack and dust on the optical disc, but also when the optical disc recording apparatus receives a strong vibration. When the focus servo fails at a time of recording, recording process is interrupted once, and the process is resumed after returning the focus servo. Conventionally, when the focus servo fails during recording the visible image, the pixel adjoined in a visible image is recorded to a separated position, and a visible image different from an original image is recorded.

SUMMARY OF THE INVENTION

It is an object of the present invention to provide an optical disc recording apparatus that can prevent data from being recorded dispersedly even if the focus servo fails.

According to one aspect of the present invention, there is provided an optical disc recording apparatus, comprising: an optical pickup that irradiates a laser light onto an optical disc; a servo device that performs focus servo for maintaining an approximately fixed distance between the optical disc and a lens of the optical pickup and outputs a signal showing whether the focus servo fails or not; a position moving device that moves an irradiating position of the optical pickup on the optical disc; a laser power controller that controls a laser power of the laser light in accordance with input data to be recorded; a detector that detects whether the focus servo fails or not in accordance with the signal output by the servo device; an obtaining device that obtains a standard position of the laser light from an irradiating position at the time of the failure of the focus servo when a failure of the focus servo is detected by the detecting device; and a controller that controls the laser power controller to pause the control of the laser power in accordance with the data to be recorded and thereafter controls the position moving device and the laser power controller to restart the control of the laser power in accordance with the data to be recorded from the standard position as a restarting position.

According to this structure, since controlling of the laser power control based on data to be recorded is resumed from the laser light irradiating position at a time of the failure of the focus servo, an influence by the failure of the focus servo can be prevented, and the data can be recorded on the optical disc seamlessly.

According to another aspect of the present invention, there is provided an optical disc recording apparatus, comprising: an optical pickup that irradiates a laser light onto an optical disc; a servo device that performs focus servo for maintaining an approximately fixed distance between the optical disc and a lens of the optical pickup and outputs a signal showing whether the focus servo fails or not; a position moving device that moves an irradiating position of the optical pickup on the optical disc; a laser power controller that controls a laser power of the laser light in accordance with input data to be recorded; a detector that detects whether the focus servo fails or not in accordance with the signal output by the servo device; an obtaining device that obtains a standard position of the laser light from an irradiating position at the time of the failure of the focus servo when a failure of the focus servo is detected by the detecting device; and a controller that controls the laser power controller to pause the control of the laser power in accordance with the data to be recorded and thereafter controls the position moving device and the laser power controller to restart the control of the laser power in accordance with the data to be recorded from a position shifted by a predetermined moving amount from the standard position as a restarting position.

According to this structure, since controlling of the laser power control based on data to be recorded is resumed from a position that is shifted from the laser light irradiating position at a time of the failure of the focus servo only by a predetermined moving amount, dispersed recordation of data on the optical disc can be prevented.

According to further aspect of the present invention, there is provided an optical disc recording apparatus, comprising: an optical pickup that irradiates a laser light onto a label surface of an optical disc; a servo device that performs focus servo for maintaining an approximately fixed distance between the optical disc and the optical pickup and outputs a signal showing whether the focus servo fails or not; a position moving device that moves an irradiating position of the optical pickup on the optical disc; a laser power controller that controls a laser power of the laser light in accordance with input data to be recorded; a detector that detects whether the focus servo fails or not in accordance with the signal output by the servo device; an obtaining device that obtains a distance and an angle as a benchmark position, the distance being from an optical disc center to an irradiating position of the laser light, and the angle being between a baseline from the optical disc center to an outer periphery and a line from the optical disc center to the irradiating position, when a failure of the focus servo is detected by the detecting device; and a controller that controls the laser power controller to pause the control of the laser power in accordance with the data to be recorded and thereafter controls the position moving device and the laser power controller to restart the control of the laser power in accordance with the data to be recorded from the benchmark position as a restarting position.

According to still another aspect of the present invention, there is provided an optical disc recording apparatus, comprising: an optical pickup that irradiates a laser light onto a label surface of an optical disc; a servo device that performs focus servo for maintaining an approximately fixed distance between the optical disc and the optical pickup and outputs a signal showing whether the focus servo fails or not; a position moving device that moves an irradiating position of the optical pickup on the optical disc; a laser power controller that controls a laser power of the laser light in accordance with input data to be recorded; a detector that detects whether the focus servo fails or not in accordance with the signal output by the servo device; an obtaining device that obtains a distance and an angle as a benchmark position, the distance being from an optical disc center to an irradiating position of the laser light, and the angle being between a baseline from the optical disc center to an outer periphery and a line from the optical disc center to the irradiating position, when a failure of the focus servo is detected by the detecting device; and a controller that controls the laser power controller to pause the control of the laser power in accordance with the data to be recorded and thereafter controls the position moving device and the laser power controller to restart the control of the laser power in accordance with the data to be recorded from a position shifted by a predetermined moving amount from the benchmark position as a restarting position.

According to the present invention, dispersed recordation of data can be prevented even if the focus servo fails.

DETAILED DESCRIPTION OF THE PREFERRED EMBODIMENTS

Figure 1:
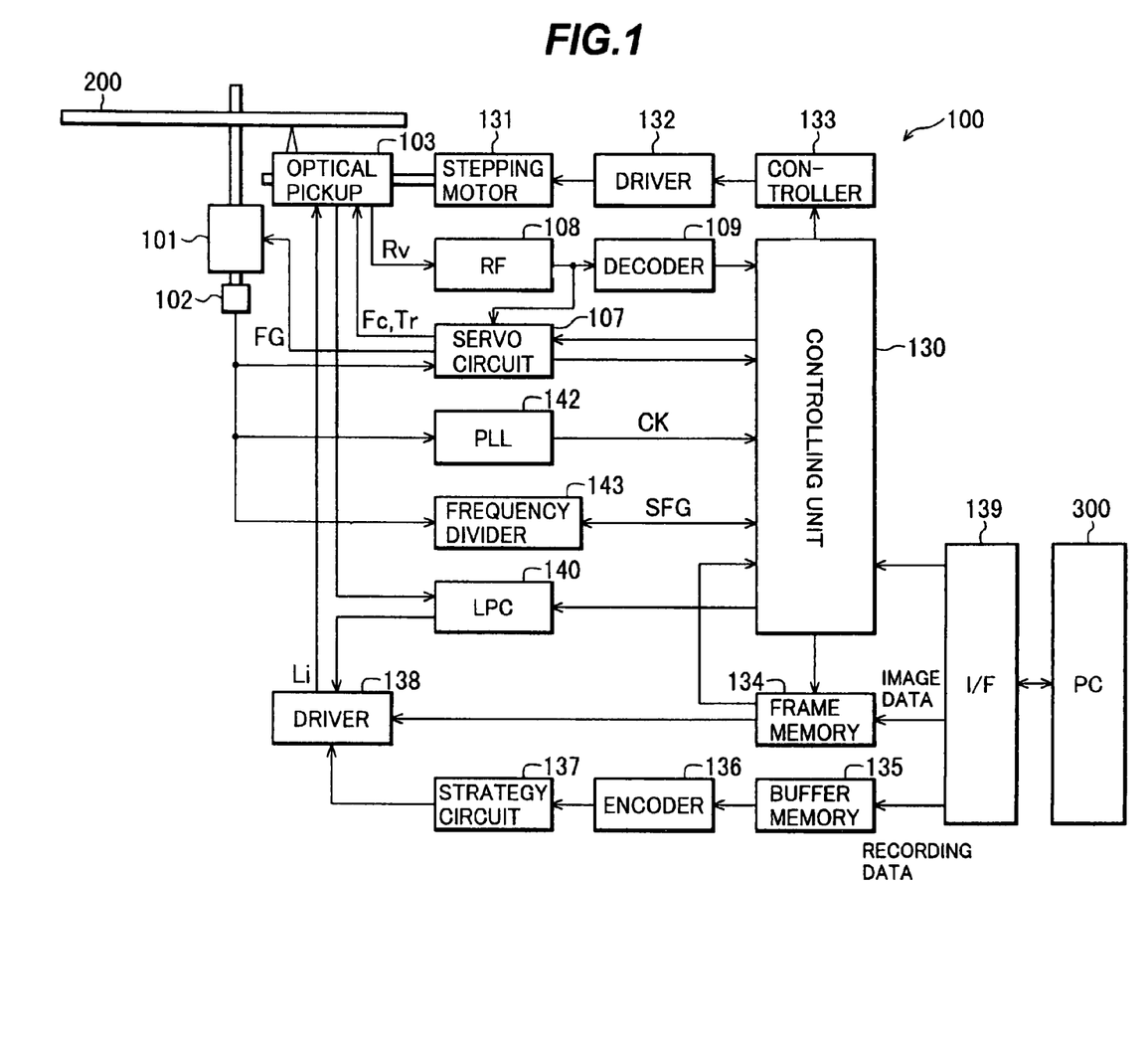
FIG. 1 is a block diagram showing an electrical structure of the optical disc recording apparatus according to an embodiment of the present invention.

FIG. 1 is a block diagram showing a structure of the optical disc recording apparatus 100 according to an embodiment of the present invention. The optical disc recording apparatus 100 is an apparatus having a visible image recording function on the recording surface of an optical disc 200 in addition to the conventional information recording function. Moreover, the optical discs 200 used in the optical disc recording apparatus 100 are general CD-R and CD-RW, and a case of the CD-R is described herein for illustrative purposes. Also, the optical disc recording apparatus 100 is connected to a personal computer (hereinafter PC) 300 via a signal cable (not shown in the drawing), and inputs recording data to be recorded and image data corresponding to the visible image on the recording surface via the signal cable. An interface based on arbitral Standard can be adopted for connection between the optical disc recording apparatus 100 and the PC 300, for example, the small computer system interface (SCSI) Standard, the Institute of Electrical and Electronics Engineers (IEEE) 1394 Standard, the AT Attachment Packet Interface (ATAPI) Standard, the Universal Serial Bus (USB) Standard and the like can be adopted.

A spindle motor 101 rotatively drives the optical disc 200. A frequency generating device 102 uses spike current of the spindle motor 101 and outputs a pulse signal FG with a frequency corresponding to a spindle rotation velocity (rotation per unit time). The optical disc recording apparatus 100 according to the embodiment of the present invention performs information recording and image recording by a Constant Angular Velocity (CAV) method. Therefore, the spindle motor 101 rotatively drives the optical disc 200 with a fixed angular velocity.

Figure 2:
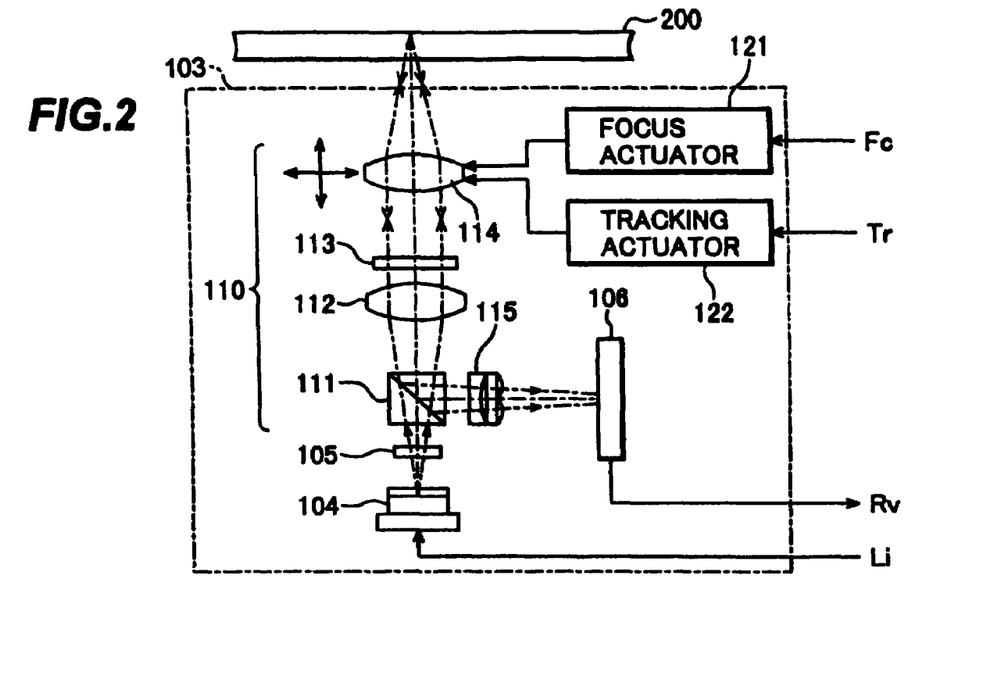
FIG. 2 is a diagram showing a structure of the optical pickup.

An optical pickup 103 is a unit for irradiating a laser light onto the optical disc 200. Its structure is shown in FIG. 2. As shown in the drawing, the optical pickup 103 includes a laser diode 104 radiating laser light, a diffraction grating 105, an optical system 110 concentrating the laser light on the surface of the optical disc 200 and a light receiving device 106 receiving a reflection light of the irradiated laser light. Moreover, the laser diode 104 irradiates a laser light corresponding to a drive signal Li from the laser driver 138 (refer to FIG. 1).

The laser light irradiated from the laser diode 104 is separated into a main beam, a preceding beam and a following beam, and these three beams are concentrated on the surface of the optical disc 200 passing through a following beam splitter 111, a collimator lens 112, a ¼ wave plate 113 and an object lens 114. On the other hand, the three laser beams reflected at the optical disc 200 are reflected at the following beam splitter 111 passing through the object lens 114, the ¼ wave plate 113 and a collimator lens 112 again and concentrated by a cylindrical lens 115 to be irradiated into the light receiving device 106. The light receiving device 106 outputs a signal corresponding to the light reception as a light receiving signal Rv to an RF amplifier 108 (refer to FIG. 1).

A stepping motor 131 is a motor for moving the optical pickup 103 toward a diameter direction of the optical disc 200. A motor driver 132 rotatively drives the stepping motor 131 corresponding to the pulse signal provided from a motor controller 133. The motor controller 133 generates a pulse signal corresponding to a moving amount and a moving direction in accordance with a moving starting instruction including a moving direction and a moving amount toward the diameter direction of the optical pickup 103 instructed by the controlling unit 130 and provides the generated pulse to the motor driver 132.

By moving the optical pickup 103 toward the diameter direction of the optical disc 200 by the stepping motor 131 and rotating the optical disc 200 by the spindle motor 101, an irradiating position of the laser light from the optical pickup 103 can be moved to various positions of the optical disc 200, and these structural elements include position controlling means.

The RF amplifier 108 amplifies the receiving light Rv from the optical pickup 103 and outputs it to the servo circuit 107 and a decoder 109 as a RF signal. Here, the RF signal becomes an EFM (Eight to Fourteen Modulation) modulated signal at a time of information reproduction of the optical disc 200. The decoder 109 performs EFM demodulating of received RF signal to generate reproducing data and outputs to the controlling unit 130.

Here, the main beam and the two sub-beams are in a positional relationship that a spot center of one sub-beam is hanging over the inner circumference side of the groove and a spot center of another sub-beam is hanging over the outside of the groove at a time that a spot center of the main beam is positioned at a center of a groove of the optical disc 200. Therefore, by calculating a difference value of light receiving levels of the sub-beams detected by the light receiving device 106, it can be known how much the main beam is shifted to the inner circumference side/perimeter side to the groove. Therefore, the servo circuit 107 generates a tracking error signal Tr in order to make the shifted amount be zero to output to a tracking actuator. Then, the main beam can accurately be traced to the groove even if the optical disc 200 rotates eccentrically (tracking servo control).

Also, the control to move the optical pickup 103 to the diametrical direction of the optical disc 200 by rotation of the stepping motor 131 is, for example, executed by the controlling unit 130 instructing the optical pickup 103 to move outside only by one step (thread control).

Figure 3:
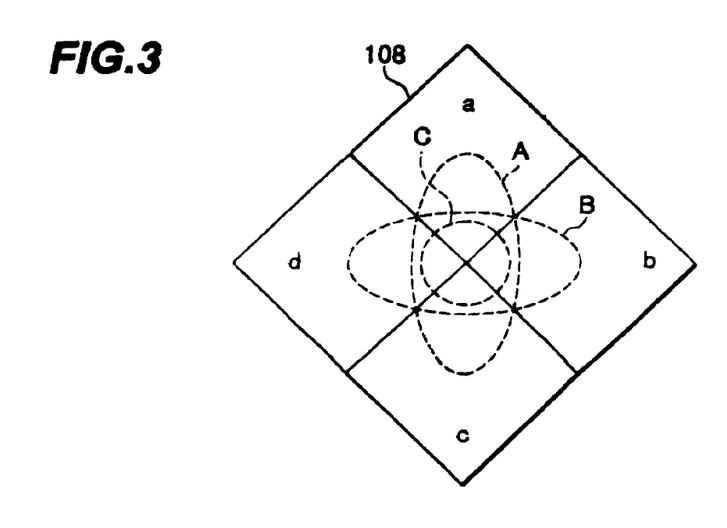
FIG. 3 is an image for explaining a light receiving device.

Also, as shown in FIG. 3, the light receiving device 106 is divided into four detecting areas, a, b, c and d. A focused image of the main beam in the light receiving device 106 becomes vertical ellipse A when an object lens 114 is close to the optical disc 200, and becomes horizontal ellipse B when the object lens 114 is far from the optical disc 200. Although it means the object lens 114 is in a focus condition at a time of information recording when the focused image is a circle C, the circle C does not necessarily mean that the focused image is in a focus condition at a time of visible image recording. It may be arbitrarily determined when planning which condition is in a focus condition at a time of visible image recording.

In light receiving intensity in the four areas, by obtaining a difference signal corresponding to (a+c)−(b+d), it can be known that the distance between the object lens 114 and the optical disc 200 is dislocated for about the difference signal. Therefore, the servo circuit 107 generates a focus error signal Fc for making the shifted amount "zero" and provide it to a focus actuator 121. Then, the spot size of the main beam can be fixed even when the optical disc 200 rotates with waving (focus servo control).

In fact, there is a limitation in the range at which the focal error signal Fc can be correctly detected. Therefore, when there is adhesion of crack and dust on the optical disc 200 and when the optical disc recording apparatus 100 receives a strong vibration, the focus servo may fail. The controlling unit 130 can detect that the focus servo fails by obtaining an intensity signal corresponding to (a+b+c+d) and always comparing to a threshold level. When the controlling unit 130 detects that the focus servo fails, the controlling unit 130 moves the object lens 114 up and down by the focus actuator 121, and executes a recovery operation to change the signal level of the above-described intensity signal in a possible range of the focus servo. Moreover, since the noise is overlapped in the intensity signal when the focus servo fails, the controlling unit 130 judges whether the focus servo fails or not based on the intensity signal after executing a process to remove the noise.

The servo circuit 107 executes a rotation velocity control of the spindle motor 101, a focus control and a tracking control of the optical pickup 103. More specifically, a pulse signal FG from the frequency generating device 102 and an instruction signal from the controlling unit 130 are input to the servo circuit 107, and the servo circuit 107 controls the spindle motor 101 to make the rotation velocity of the spindle motor 101 indicated by the pulse signal FG approximately the same as the rotation velocity indicated by the instruction signal. As described above, in the optical disc recording apparatus 100 according to an embodiment of the present invention, where the CAV method is applied, the servo circuit 107 rotatively drives the spindle motor 101 at a fixed angular velocity instructed by the controlling unit 130. However, the application is not limited to the use of the CAV method; there is, e.g., a Constant Linear Velocity (CLV) method that rotatively drives the optical disc 200 at a fixed linear velocity. Of course, any of the above-described methods may be used.

Next, a buffer memory 135 and a frame memory 134 temporarily store various types of data provided from the PC 300 via an interface 139. More specifically, the buffer memory 135 stores recording data to be recorded on the recording surface of the optical disc using the Fast In Fast Out (FIFO) method. An encoder 136 performs an EFM modulation on the recording data read from the buffer memory 135 to output to a strategy circuit 137. The strategy circuit 137 performs a time axis correcting process to data provided from the encoder 136 to output to a laser driver 138.

Figure 4:
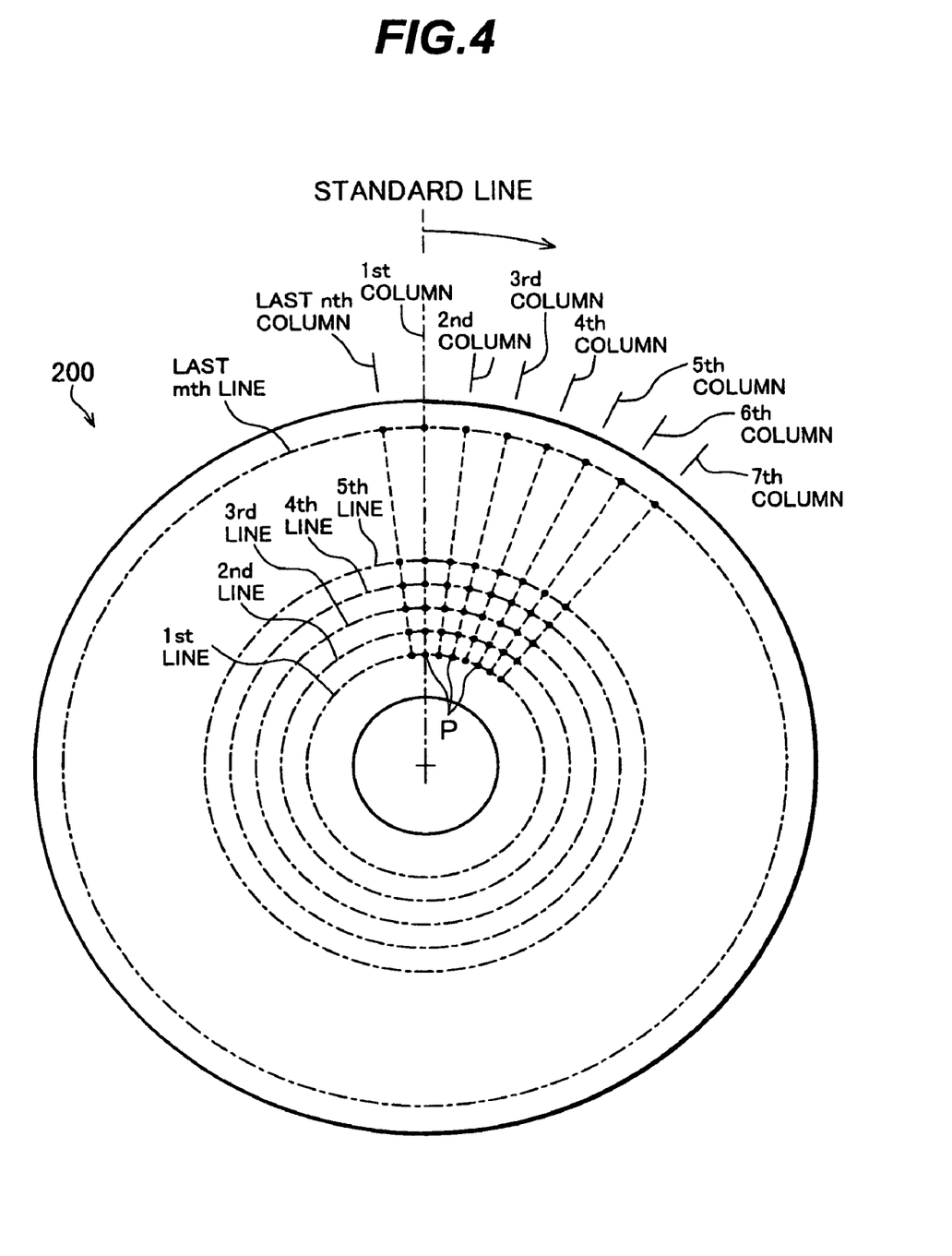
FIG. 4 is an image for explaining coordinates of the optical disc determined by image data.

On the other hand, the frame memory 134 stores image data of the visible image to be formed on the optical disc 200. This image data is a set of data to determine a concentration (contrast) of pixels to be drawn on the optical disc 200. As shown in FIG. 4, each pixel P is defined in correspondence with each intersection between a concentric circle of the optical disc 200 and radiation from the center. In order to explain the intersection coordinates in the optical disc 200, concentric circles are sequentially defined to be a first line, a second line, a third line, . . . an mth line (the last line) from the inside to the outside of the disc, and when one radiating line is defined to be a standard line, the other radiating lines are sequentially defined to be a first column, a second column, a third column, . . . , an nth column (the last column) in a clockwise order. The drawing in FIG. 4 shows each pixel position illustratively; in actuality, each pixel is arranged more closely.

The reason for defining an arrangement of pixels in the manner shown in FIG. 4 is as follows: On the Standard, the optical disc rotates counterclockwise looking from the recording surface at a time of information recording to the optical disc 200, and the optical pickup has a structure to move from the inside to the outside. When the above-described structure is premised, even in a state that the label surface is set to be encountered with the optical pickup 103, the optical disc 200 rotates counterclockwise, and the optical pickup 103 moves from the inside to the outside. Therefore, when the optical disc 200 is viewed from the optical pickup 103, the optical disc 200 rotates counterclockwise and the optical pickup 103 moves from the inside to the outside of the optical disc 200. The order of the above-described arrangement of pixels corresponds to a scanning order of optical pickup 103.

Image data are stored in the frame memory 134 in an arrangement of m lines and n columns. The image data stored in the frame memory 134 are read out line by line by the controlling unit 130 to be provided to the laser driver 138 pixel by pixel.

The laser driver 138 drives the laser diode 104 of the optical pickup 103 in accordance with control of laser power controlling circuit 140 in accordance with modulated data provided from the strategy circuit 137 at a time of information writing and in accordance with image data provided from the frame memory 134 at a time of visible image recording.

On the other hand, laser power of the laser diode 104 is controlled as follows. That is, the optical pickup 103 has a front monitor diode (not shown in the drawing), and the front monitor diode receives a monitor light of the laser diode 104 (light from a back of a chip of the laser diode 104), and generates electric current corresponding to a light receiving amount. Then the generated electric current is output to the laser power controlling circuit 140 as a monitor electric current.

The laser controlling circuit 140 controls the laser power irradiated from the laser diode 104 corresponding to the input monitor electric current value. In concrete, the laser power controlling circuit 140 uses the monitor electric current value and executes feedback control of the laser driver 138 so that the laser light at the target laser power is irradiated from the optical pickup 103. A target value of the laser power is an ideal laser value instructed by the controlling unit 130, and actually a monitor electric current value corresponding to the laser power is instructed.

The controlling unit 130 includes the central processing unit (CPU), the read only memory (ROM), the random access memory (RAM) and the like, and controls each part of the optical disc recording apparatus 100 in accordance with a program stored in the ROM. The controlling unit 130 is configured such that control of the information recording process and the visible image recording process to the optical disc 200 is centralized.

Next, an operation of the optical disc recording apparatus 100 according to the embodiment of the present invention is described. A main feature of the optical disc recording apparatus 100 is recording of a visible image to the optical disc 200. On the other hand, in addition to the conventional information recording function, a secondary feature is a multi-purpose device that also has the visible image recording function. Hereinafter, operation at a time of information recording is explained briefly, and operation at a time of the visible image recording that is a feature of the present invention is explained in detail.

In the optical disc recording apparatus 100, when the optical disc 200 is set, the controlling unit 130 executes the rotation control of the spindle motor 101 by the servo circuit 107 so that the angular velocity of the optical disc 200 becomes a predetermined angular velocity. Also, the controlling unit 130 rotates a stepping motor 131 by executing moving start instruction to a motor controller 133 to the optical pickup 103 to a position equivalent to a lead-in area.

Next, the controlling unit 130 reads out ATIP information recorded in the lead-in area. Since information of a medium type, an ideal laser power and a manufacturer brand is written properly in the ATIP information, the controlling unit 130 sets a target value of the laser power based on this information. For example, the controlling unit 130 executes a process that the ideal laser power value written in ATIP information sets to the target value without changing or a process to select the target value of the laser power by referencing a table that corresponds to the manufacturer brand and the laser power based on information written in ATIP information such as the manufacture brand. Then, the target value of the laser power of the laser power controlling circuit 140 is set. By doing this, the controlling unit 130 sets the target value of the laser power easily based on the ATIP information.

When the rotation control of the spindle motor 101 is being executed, the tracking servo control to trace the groove of the optical disc 200 and the focus servo control are always executed in parallel. Also, when the controlling unit 130 detects failure of the focus servo, it makes the focus actuator 121 move the object lens 114 up and down, and executes a control to resume the focus servo.

Then, when the recording data is provided from the PC 300, the controlling unit 130 records the recording data in the buffer memory 135 and reads out in a recorded order to execute EFM demodulation by the encoder 136. Then, a time axis correction process is executed by the strategy circuit 137.

Next, the controlling unit 130 controls the laser driver 138 to change the laser power of the laser light irradiated from the optical pickup 103 to a write level and a servo level in accordance with data from the strategy circuit 137. The write level is a power level to change reflectivity of the laser irradiating area sufficiently to a recording layer 202 of the optical disc 200. On the other hand, although the servo level is a power level not to change reflectivity of the laser irradiating area, it is a level to satisfy the power level to obtain a recording write level that can execute tracking control and focus servo control.

Here, the write level is set to be controlled by the target value of the laser power set by the controlling unit 130 from the ATIP information by the laser power controlling circuit 140. In this way, the recording data is recorded to the optical disc 200 at a low error rate. Moreover, at a time of information recording, at the same time of the above-described process, the rotation control of the spindle motor 101, the tracking control for tracking group and focus control are always executed, and the recording data is recorded along with the groove 202a of the optical disc 200 from inside.

Next, operation at a time of visible image recording is described. Although, at a time of visible image recording, the rotation control of the spindle motor 101 and the focus control is always executed, the tracking control for tracking groove 202a is not executed as described in the above. In the operation at a time of visible image recording, there are features as a secondary operation such as focus control and detection of the laser irradiating position. Therefore, after explaining them, the main operation is explained.

Figure 5:
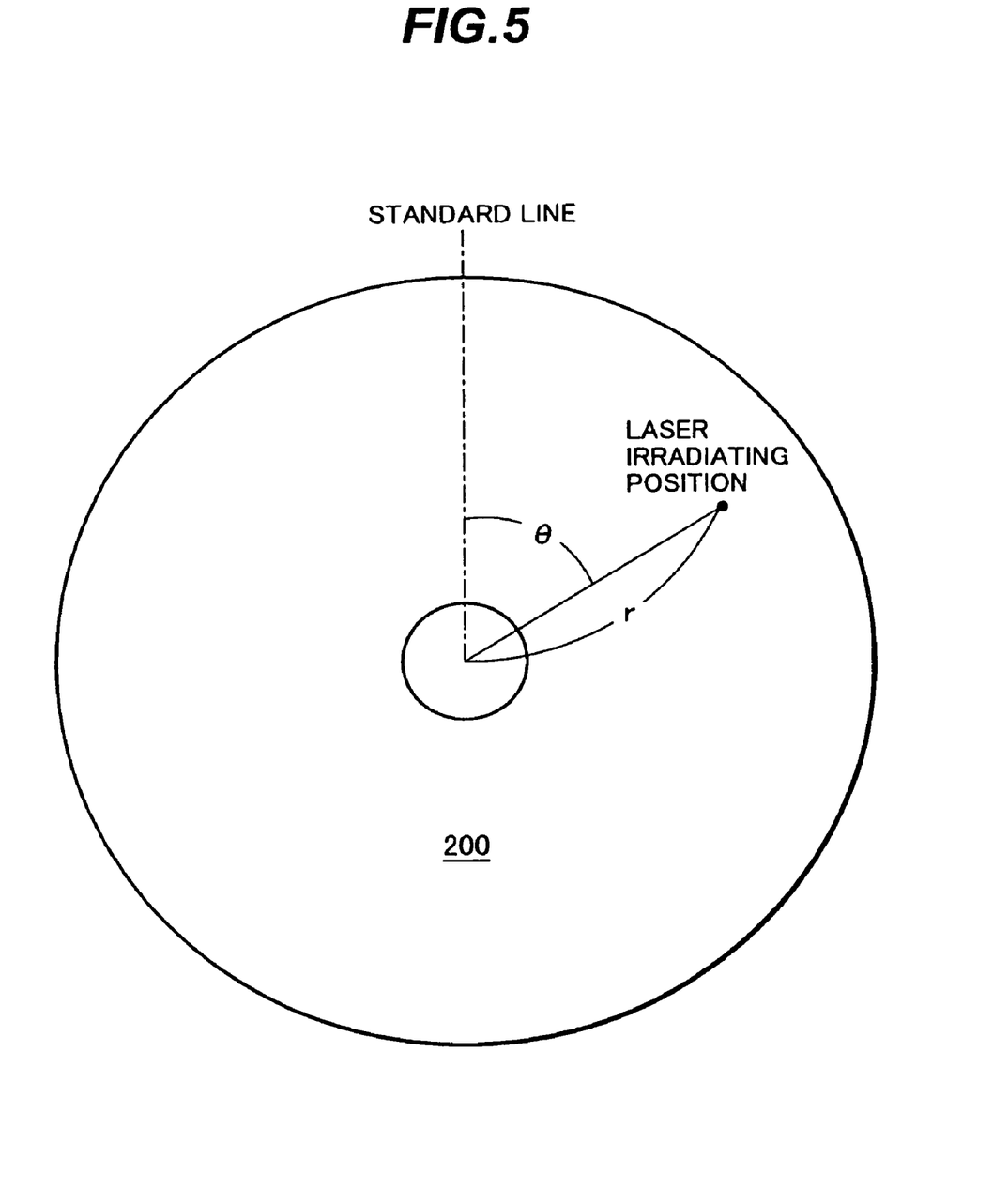
FIG. 5 is an image for explaining the laser irradiating position.

At a time of visible image recording, detection of the laser irradiating position is executed as follows. In the embodiment of the present invention, the laser irradiating position is detected from polar coordinates (the distance r from the center of the optical disc 200, angle θ from a standard line of the optical disc 200) as shown in FIG. 5. Hereinafter, detection of the standard line on the optical disc 200 and the laser irradiating position are explained.

A frequency generating device 102 outputs a pulse signal FG whose frequency corresponds to the spindle rotation velocity as described in the above. A phase locked loop (PLL) circuit 142 generates a clock signal CK multiplied by the frequency of the pulse signal FG and outputs the generated signal to the control unit 130. Also, a frequency divider 143 generates a standard signal SFG by frequency dividing the signal FG and provides it to the controlling unit 130.

Figure 6:
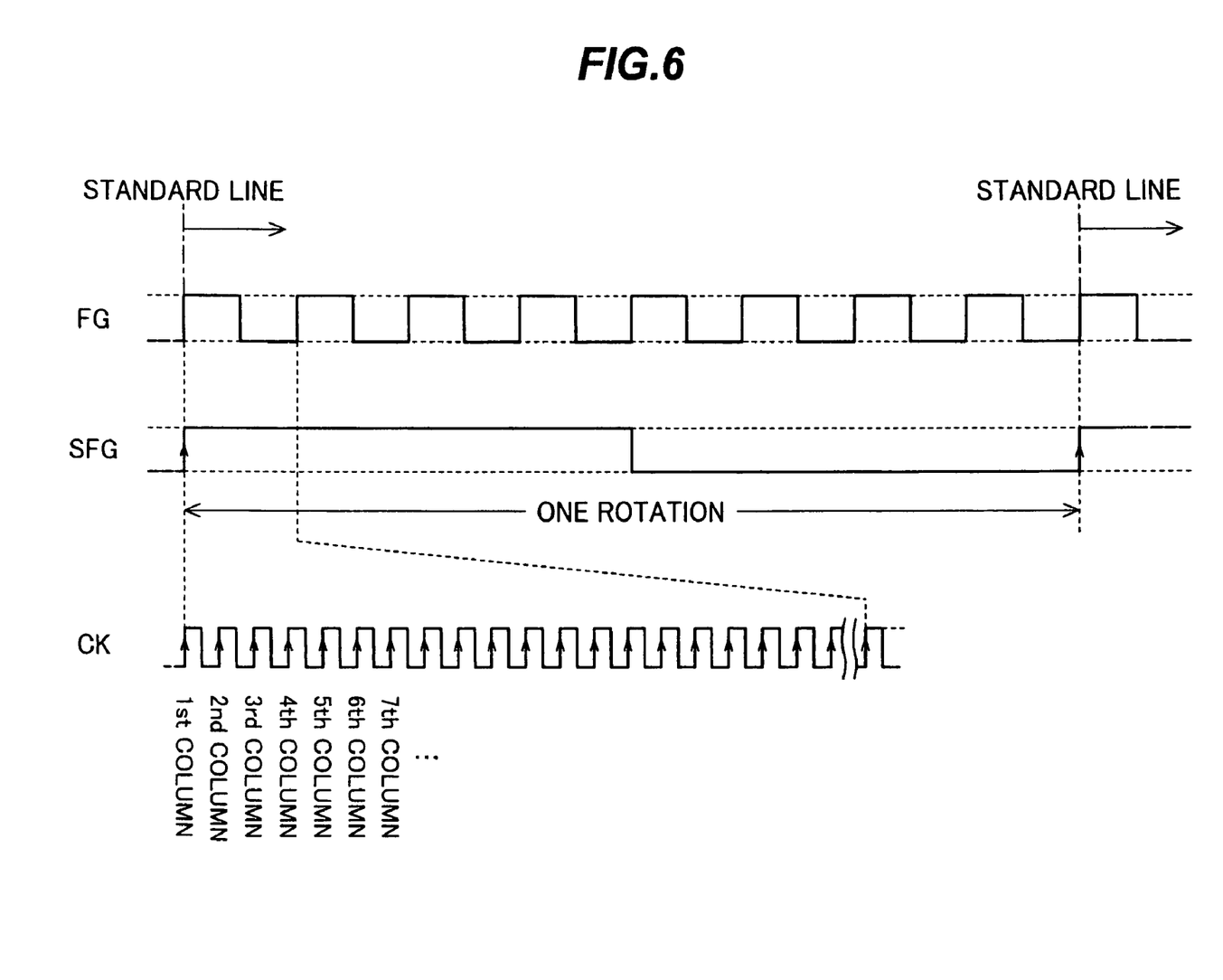
FIG. 6 is an image for explaining detection of the laser irradiating position.

Here, when the frequency generating device 102 generates eight pulses as pulse signals FG during one rotation of the spindle motor 101, that is, while the optical disc 200 rotates once, as shown in FIG. 6, the frequency divider 143 frequency divides the signal FG into ⅛ to output as a standard signal SFG Therefore, the controlling unit 130 can detect that a booting up timing of the standard signal SFG is s timing that the laser irradiating position passes the standard line of the optical disc 200.

Also, in this case, when a frequency multiplicity in the PLL circuit 142 is set to be a quotient that is the number of columns in a line is divided by eight, one cycle of the clock signal CK corresponds to the duration that the optical disc 200 rotates with angle for one column of the pixel arrangement. The controlling unit 130 can detect the angle θ for the laser irradiating position by counting the booting up timing of the clock signal CK in order from booting up the standard signal SFG Moreover, an expression of the standard line of the optical disc 200 should be said to be a standard line to a rotation axis of the spindle motor 101 in a strict sense of the wording. Since the optical disc 200 rotates with being chucked by a table (not shown in the drawing) directly connected with the rotation axis, the standard line to the rotation axis of the spindle motor 101 keeps a fixed position relationship with radiation of the optical disc 200. Therefore, one radiation in the optical disc 200 may be read as the standard line of the optical disc 200 as long as that condition is maintained.

Also, in the embodiment of the present invention, the booting up timing of the standard signal SFG is defined as a standard line passing timing of the optical disc 200, and the booting up timing of the clock signal CK is defined as a timing rotated with angle for one column of the pixel arrangement. In both cases, booting down timing may certainly be used.

On the other hand, the controlling unit 130 executes a moving start instruction including moving direction to the diametrical direction of the optical pickup 103 and moving amount, and the optical pickup 103 is moved to the diametrical direction of the optical disc 200. Here, the distance r from the center of the optical disc 200 of the laser irradiating position can be determined by the moving start instruction. By doing that, the controlling unit 130 can detect the distance r and the angle θ of the laser irradiating position.

Figure 7:
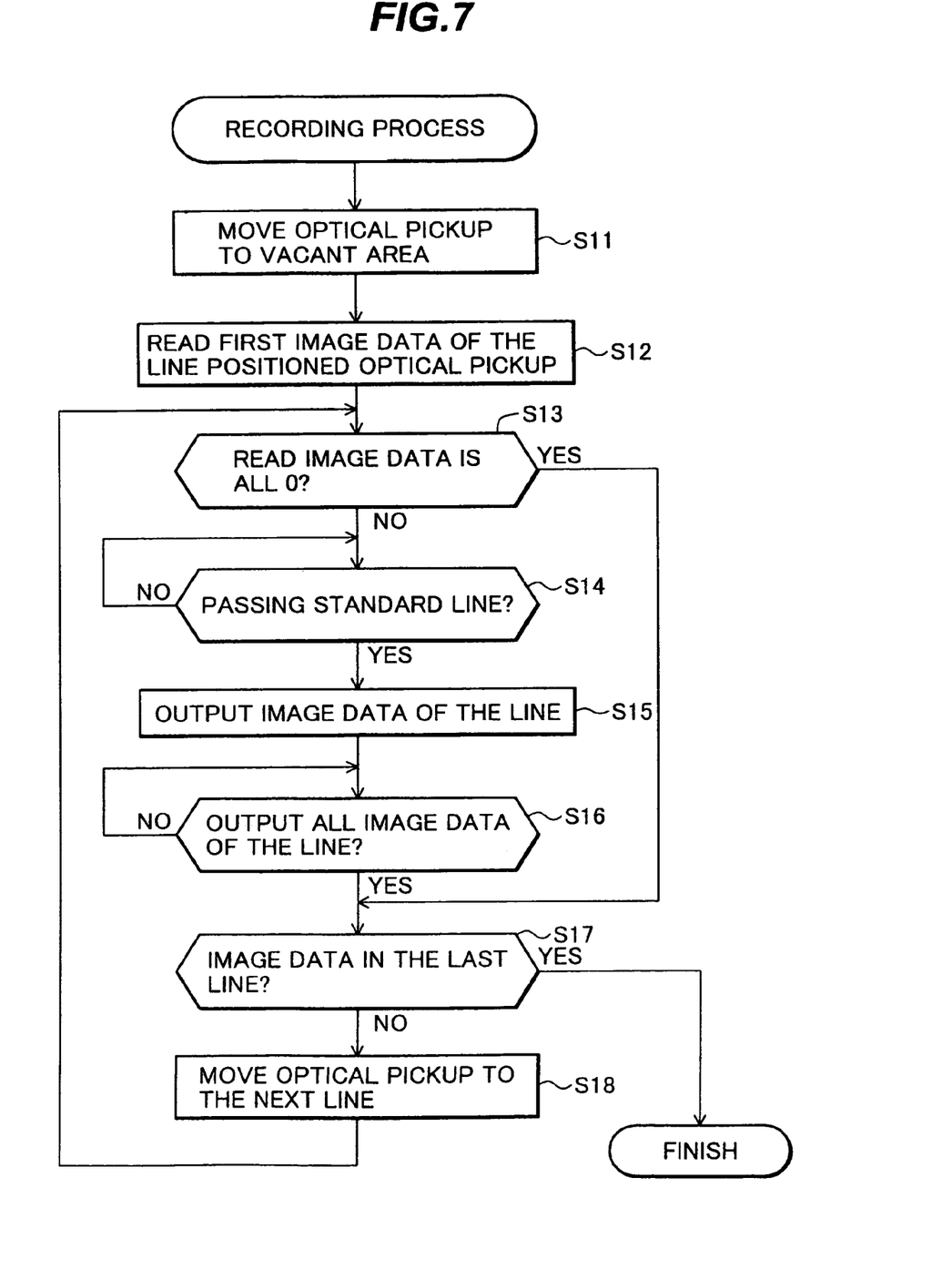
FIG. 7 is a flow chart showing a main flow of a controlling unit at a time of recording.

FIG. 7 is a main flow of the controlling unit 130 at a time of recording.

When the image data is provided from the PC 300, the controlling unit 130 records the image data in the frame memory 134 and outputs a command to make the optical pickup 103 move to the most inside point in a blank area of the optical disc 200 (Step S11). By this command, a motor controller 133 generates a signal necessary for making the optical pickup 103 move to the point, and the motor driver 132 makes the stepping motor 131 rotate. Then, the optical pickup 103 moves to the point. Moreover, the controlling unit 130 finds the blank area by reading out information in the lead-in area of the optical disc 200. Therefore, when information is not recorded in the optical disc 200, the controlling unit 130 moves the optical pickup 103 to the most inside point.

Next, the controlling unit 130 reads in advance only the first one line of image data of the image data stored in the frame memory 134 where the optical pickup 103 is positioned (Step S12). Then, the controlling unit 130 judges whether all of the image data for the one line read first is "0" or not (Step S13). The judgment (i.e., determination) that all the image data for one line is "0" means that it is necessary to heat discolorate this line of the thermosensitive layer 205. Therefore, when this judging result is positive, the controlling unit 130 skips processes and advances to Step S17 for shortening time necessary for the visible image recording.

On the other hand, when the judging result is negative, the controlling unit 130 waits a booting-up timing of the standard signal SFG (Step S14).

Then, the standard signal SFG is booted up, the controlling unit 130 reads out the image data for one line read in advance or the image data of the line from the frame memory 134, and provides the image data of each column at a synchronized timing for one cycle of the clock signal CK to the laser driver 138 (Step S15). By doing that, the controlling unit 130 controls the laser driver 138 to change the laser to the write level and the servo level corresponding to the image data. In concrete, when the image data is "1", the controlling unit 130 controls the laser power to the write level. When the image data is "0", the controlling unit 130 controls the laser power to the servo level. By that, the laser irradiating position at the write level is heat discolorated.

As described in the above, since the image data of each column that includes the image data of one of the lines is provided at the synchronized timing for one cycle of the clock signal CK, change of the laser power is also executed at the synchronized timing for one cycle of the clock signal CK. Therefore, at each time when the optical disc 200 rotates at an angle corresponding to one pixel from the standard line, the laser light is irradiated at a power corresponding to the image data of the column corresponding to the laser irradiating position, and an image of one line of the visible image is recorded on the label surface.

Next, when all the image data in the one line is output (Step S16), the controlling unit 130 judges whether the output image data is the image data in the last line or not (Step S17). When the judging result is negative, the controlling unit 130 outputs a command to move the optical pickup 103 only by the position corresponding to the next line toward the diameter direction and move the optical pickup 103 to the next line (Step S18). Moreover, the controlling unit 130 advances the process to Step S12.

By doing that, the image data in the next line is read out from the frame memory 134, and the above-described processes, Steps S12 to S16, are repeated. By that, the image data of the visible image are recorded one line by one line on the label surface.

Then, when the judging result of Step S17 is positive, that is, when the image data recording of the last line is finished, the controlling unit 130 finishes the recording process. By that, an image corresponding to the image data is recorded on the surface of the optical disc 200. The above is the main flow of the recording process.

Figure 8:
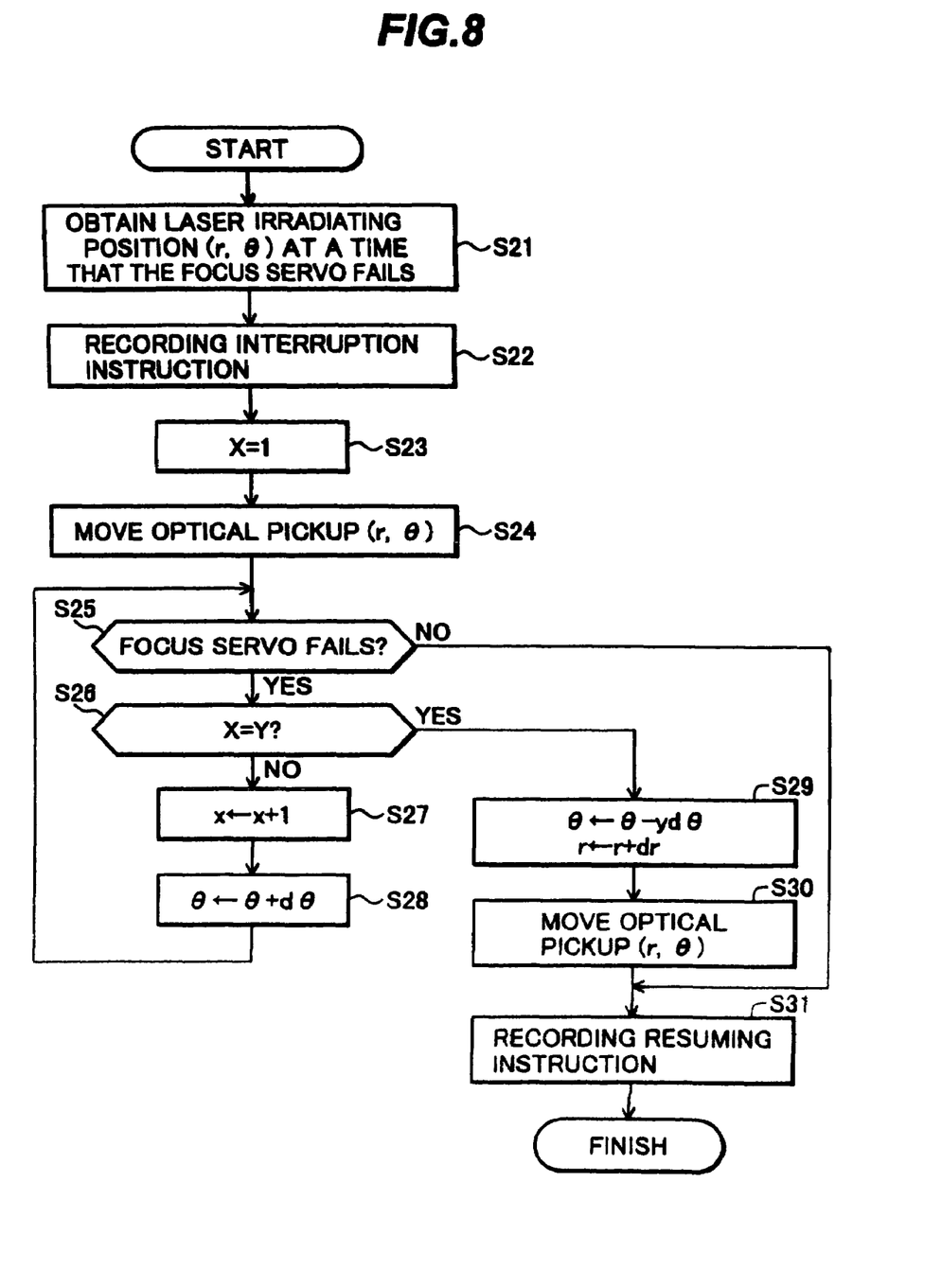
FIG. 8 is a flow chart showing a process executed when the focus servo fails.

Next, an operation when the focus servo fails during recording described in the above is explained. Here, FIG. 8 is a flow chart showing a process executed when the focus servo fails. That is, when the controlling unit 130 detects a failure of the focus servo, it obtains the laser irradiating position (r, θ) at that time (Step S21). Also, the controlling unit 130 outputs an interruption command to interrupt the recording process (Step S22). By this command, the laser driver 138 switches the laser power of the laser diode 104 to the servo level. Then the laser power switching control corresponding to the image data is interrupted.

Next, the controlling unit 130 sets "1" for a variant x (Step S23). Here, the variant x is used for grasping the number of times of retry to execute recording. Therefore, it is grasped to be the first time retry by setting "1" for the variant x. Then, the controlling unit 130 outputs a command to move the optical pickup 103 to the position where obtained the optical pickup 103 (distance r, angle θ) (Step S24). By this command, the motor controller 133 rotates the stepping motor 131 to move the optical pickup 103 to the point.

When the focus servo does not fail after moving (Step S25), the controlling unit 130 shifts the process to Step S31 described later, and outputs a recording command to resume the interrupted process to finish the process. By this command, recording process is resumed from the position where the focus servo fails, and the visible image is recorded. By that, the visible image can be recorded on the optical disc 200 without a joint even if the focus servo fails. The retrying operation is especially effective when the focus servo fails by an external vibration. That is, when the focus servo fails by receiving the external vibration, the focus servo does not fail even if the optical pickup 103 is moved to the position after that. Therefore, even if the focus servo fails by the external vibration, the optical disc recording apparatus 100 can prevent the influence and record the visible image seamlessly.

On the other hand, when it is detected that the focus servo fails after the optical pickup 103 moves to the position (r, θ) (Step S25), the controlling unit 130 judges whether the variant x is equal to y or not (Step S26). Here, y (y>1) is a maximum value of the number of re-tries; for example, a value "4" is set. If the judging result is negative, the controlling unit 130 increases the variant x by "1" (Step S27), and the process proceeds to Step S24 after renewing the obtained angle θ to a value of "θ+dθ". Thus, the optical pickup 103 is moved from the last position to a position (r, θ+dθ), i.e., rotated by an angle dθ in a clockwise direction (refer to FIG. 5), and the recording process is resumed from the position in a case that the focus error is not detected (Step S31). That is, the recording process is resumed at a position that is moved by a predetermined amount to a reading (rotating) direction of the optical pickup 103 from the position where the focus servo error was previously generated. In this way, when there are black marks, such as crack or dust at a position where the focus error was previously generated, the recording process is resumed by avoiding the position. Since this recording process is for recording the visible image, it is preferable that an adjacent space in the visible image is not tried to become larger. Therefore, the angle dθ to determine the above-described space may preferably be the minimum moving direction angle or an angle close to it.

When a focus error is detected even if the position of the optical pickup 103 is moved to the position (r, θ+dθ) (Step S25), the controlling unit 130 judges whether the variant x is equal to y or not (Step S26). When the judging result is negative, the controlling unit 130 executes Step S27, Step S28, Step S24, and Step S25. That is, the position of the optical pickup 103 is moved to a position (r, θ+2dθ). At this time, if the focus error is not detected, the process proceeds to Step S31 to resume recording. On the other hand, if the focus error is detected, a rotation process of Step S27, Step S28, Step S24, and Step S25 is repeated. By doing that, resumption of the recording process is attempted by shifting the position of the optical pickup 103 in the diametrical direction little by little. Then, when the laser irradiating position avoids the black mark, the recording process is resumed.

On the other hand, if the judging result is positive at Step S26, the controlling unit 130 returns the position of the optical pickup 103 by an angle ydθ to re-position it to the angel at which the focus servo failed for the first time, and the distance r is increased by a distance dr (Step S29). Then the optical pickup 103 is moved to the set position (Step S30). By doing that, in a case that the focus error is detected even if the position of the optical pickup 103 is moved by an angle dθ for y times, the optical pickup 103 is moved to the outside direction only by dr. A minimum moving direction (for 1 step) to the radius direction, a value close to that or a distance corresponding to one line space may be set as the distance dr. After that, the controlling unit 130 resumes the recording process at the position (Step S31) to finish the process.

In a case that the black mark cannot be avoided even though the optical pickup 103 is moved toward a reading (rotating) direction along the circumference, the black mark is avoided by moving the optical pickup 103 toward the diametrical direction of the optical disc 200. That is, in a case that the black mark exists along the direction of circumference for a long time, the black mark is avoided by moving the optical pickup 103 toward the diametrical direction. In this way, the visible image recording can be resumed from a possible nearest position of where the focus servo fails for the first time.

As described above, according to the optical disc recording apparatus 100 in the embodiment of the present invention, when the focus servo fails, the recording process is tried again at that position. Therefore, in a case where the focus servo fails by an external vibration even though it is the recordable area without a black mark, the recording process can be resumed from the position where the focus servo failed. In this way, the visible image can be recorded without a joint.

Also, in a case that the focus servo fails again, the laser irradiating position is moved to a reading (rotating) direction along the circumference of the optical disc 200 by an angle of dθ in order to re-try the recording process. Then, the black mark extending in the circumference direction is avoided, and recording can be resumed from a position from the latest avoided position.

Moreover, when the focus servo fails even though the laser irradiating position is moved in the reading (rotating) direction along the circumference of the optical disc 200 at a certain extent, the recording process is executed from where the focus servo failed for the first time, but moved to the outside direction. When the focus servo is far from the point where the focus servo fails at first by moving the optical pickup 103 toward the direction of the circumference to avoid the black mark, the optical pickup 103 will be moved toward the diametrical direction. In this way, the recording process can be resumed from a position near the position where the focus servo failed for the first time.

As described above, since the recording process can be resumed from the same position where the focus servo failed, or the nearest possible position, even though the focus servo failed by vibration or by encountering a black mark, dispersed recordation of the visible image on the optical disc can be avoided, and a correct visible image can be recorded.

The present invention is not limited only to the above embodiments. It is apparent that various modifications, improvements, combinations, and the like can be made by those skilled in the art. For example, the following modifications can be possible.

In the above embodiments, although the description relates to resumption of the recording process from the same position, or the nearest possible position, when the focus servo fails during recording of a visible image, it is needless to say that the inventive apparatus and method can be adopted to information recording. Also, although, in the above embodiments, when the focus servo fails, the recording process is resumed from the same position where the focus servo failed, the writing process does not have to always be restarted at the same point.

However, it is desirable that the recording process is resumed from the same position when the focus servo fails by vibration, it is highly possible that the focus servo fails even though recording is resumed at the same position in a case of the optical disc recording apparatus 100 that is under condition where it is hard to receive vibration, and it will take processing time vainly. Therefore, the processing time may be shortened by resuming the process from a position that is moved only by a predetermined distance from the position at a time that the focus servo failed.

Although the above-described embodiments relate to moving the resumption position of the recording process in the diametrical direction of the optical disc 200 only when the focus servo fails even though the resumption position has been moved in the circumference direction, in a case that the focus servo does not fail if the resumption position of the recording process may be moved in the diametrical direction of the optical disc 200 first, the position may be moved in the diametrical direction of the optical disc 200 in a case that the focus servo does not fail. Also, the user may select either to move the resumption position of the recording process in the circumference direction of the optical disc 200 or in the diametrical direction of the optical disc 200.

In addition, although, in the above embodiments, the application of the present invention for recording a visible image on the data recording surface of an optical disc has been described, the invention may be equally applied to recordation of a visible image on the label surface of the optical disc. Hereinafter, an example of an optical disc 200A is presented, wherein information, such as a visible image, can be recorded on the label surface.

Figure 9:
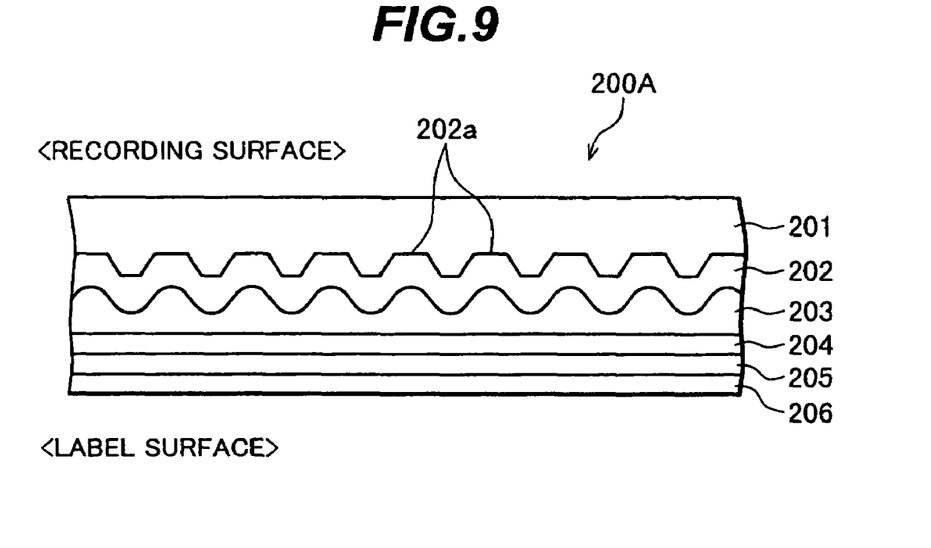
FIG. 9 is a cross sectional view of the optical disc that can record on a label surface.

FIG. 9 is an example of a cross sectional view of the optical disc 200A that can record on a label surface. The optical disc 200A has a structure laminated a protection layer 201, a recording layer 202, a reflection layer 203, a protection layer 204, a thermosensitive layer 205, and a protection layer 206 in that order. The optical disc 200A has almost the same structure as a conventional CD-R, except for the thermosensitive layer 205. It is noted that the structure shown in FIG. 9 is for illustrative purposes only, and the size ratio of each layer is not necessarily drawn/shown to scale.

On the recording layer 202, a groove (guide groove) 202a is formed on the surface (upper part in the drawing) spirally. When information (including the visible image) is recorded on the recording surface of the optical disc 200A, laser light is irradiated along the groove 202a to perform a heat discoloration of the recording layer 202. That is, the recording surface of the optical disc 200A is set in order to counter with the optical pickup 103, and information is recorded by moving laser light along the groove 202a. On the other hand, when information (including the visible image) is recorded on the label surface of the optical disc 200A, the label surface is set in order to counter with the optical pickup 103. Then, information is recorded performing the heat discoloration of the thermosensitive layer 205 by laser light.

Figure 10:
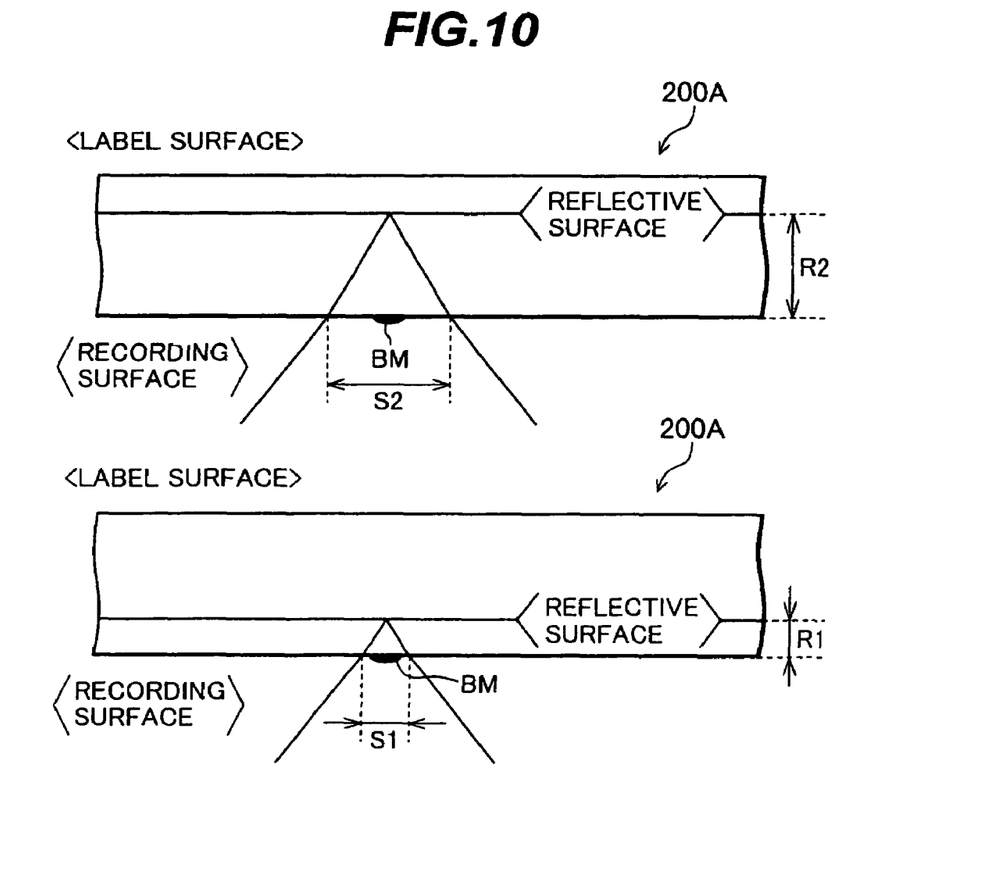
FIG. 10 is a diagram showing the laser irradiating position for irradiation on the recording surface and on the label surface.

FIG. 10 shows the cases in which the laser light is irradiated on the recording surface (upper part of the drawing) and the label surface (lower part of the drawing). As shown in the drawing, if the standard of an optical disc is followed, the distance R1 of the reflective surface from the label surface will become quite short compared with the distance R2 of the recording surface to the reflective surface. Therefore, when the laser light is concentrated on the reflective surface, a spot size S1 of the label surface will become smaller than a spot size of the recording surface. Therefore, when it is assumed that black marks BMs of the same size are in the laser spot, irradiation of the laser light on the label surface is more greatly influenced than irradiation of the laser light on the recording surface. That means that it is easier to fail the focus servo in the case of irradiating laser light on the label surface. Therefore, the present invention can be especially beneficial in recording on the label surface, i.e., the incidence of dispersed recordation of data can be reduced sharply.

What is claimed is:

1. An optical disc recording apparatus, comprising:
    an optical pickup that irradiates a laser light onto an optical disc;
    a servo device that performs focus servo for maintaining an approximately fixed distance between the optical disc and the optical pickup and outputs a signal showing whether the focus servo fails or not;
    a position moving device that moves an irradiating position of the optical pickup on the optical disc;
    a laser power controller that controls a laser power of the laser light in accordance with input data to be recorded;
    a detector that detects whether the focus servo fails or not in accordance with the signal output by the servo device;
    an obtaining device that obtains a distance and an angle as a benchmark position, the distance being from an optical disc center to an irradiating position of the laser light, and the angle being between a baseline from the optical disc center to an outer periphery and a line from the optical disc center to the irradiating position, when a failure of the focus servo is detected by the detecting device; and
    a controller that controls the laser power controller to pause the control of the laser power in accordance with the data to be recorded and thereafter controls the position moving device and the laser power controller to restart the control of the laser power in accordance with the data to be recorded from the benchmark position as a restarting position.

2. The optical disc recording apparatus according to claim 1, wherein the optical pickup includes:
    a diffraction grating;
    a laser diode for radiating laser light;
    an optical system for concentrating the laser light on the surface of the optical disc; and
    a light receiving device for receiving a reflection light of the irradiated laser light.

3. The optical disc recording apparatus according to claim 1, further including a frame memory to store image data of a visible image to be formed on the optical disc.

4. The optical disc recording apparatus according to claim 1, further including:
    a buffer memory to store recording data to be recorded on the optical disc;
    an encoder to encode the recording data read from the buffer memory; and
    a strategy device to perform time axis correction on the encoded recording data.

5. The optical disc recording apparatus according to claim 4, wherein the encoder uses Eight to Fourteen Modulation (EFM) to encode the recording data.

6. An optical disc recording apparatus, comprising:
    an optical pickup that irradiates a laser light onto an optical disc;
    a servo device that performs focus servo for maintaining an approximately fixed distance between the optical disc and the optical pickup and outputs a signal showing whether the focus servo fails or not;
    a position moving device that moves an irradiating position of the optical pickup on the optical disc;
    a laser power controller that controls a laser power of the laser light in accordance with input data to be recorded;
    a detector that detects whether the focus servo fails or not in accordance with the signal output by the servo device;
    an obtaining device that obtains a distance and an angle as a benchmark position, the distance being from an optical disc center to an irradiating position of the laser light, and the angle being between a baseline from the optical disc center to an outer periphery and a line from the optical disc center to the irradiating position, when a failure of the focus servo is detected by the detecting device; and
    a controller that controls the laser power controller to pause the control of the laser power in accordance with the data to be recorded and thereafter controls the position moving device and the laser power controller to restart the control of the laser power in accordance with the data to be recorded from a position shifted by a predetermined moving amount from the benchmark position as a restarting position.

7. The optical disc recording apparatus according to claim 6, wherein the optical pickup includes:
    a diffraction grating;
    a laser diode for radiating laser light;
    an optical system for concentrating the laser light on the surface of the optical disc; and a light receiving device for receiving a reflection light of the irradiated laser light.

8. The optical disc recording apparatus according to claim 6, further including:
a buffer memory to store recording data to be recorded on the optical disc;
an encoder to encode the recording data read from the buffer memory; and
a strategy device to perform time axis correction on the encoded recording data.

9. The optical disc recording apparatus according to claim 8, wherein the encoder uses Eight to Fourteen Modulation (EFM) to encode the recording data.

10. The optical disc recording apparatus according to claim 6, further including a frame memory to store image data of a visible image to be formed on the optical disc.

11. An optical disc recording method, comprising:
(a) irradiating a laser light onto an optical disc;
(b) performing focus servo for maintaining an approximately fixed distance between the optical disc and the optical pickup and outputting a signal showing whether the focus servo fails or not;
(c) moving an irradiating position of the optical pickup on the optical disc;
(d) controlling a laser power of the laser light in accordance with input data to be recorded;
(e) detecting whether the focus servo fails or not in accordance with the signal output at the step (b);
(f) obtaining a distance and an angle as a benchmark position, the distance being from an optical disc center to an irradiating position of the laser light, and the angle being between a baseline from the optical disc center to an outer periphery and a line from the optical disc center to the irradiating position, when a failure of the focus servo is detected at the step (e); and
(g) executing the step (d) to pause the control of the laser power in accordance with the data to be recorded and thereafter executing the step (c) and the step (d) to restart the control of the laser power in accordance with the data to be recorded from the benchmark position as a restarting position.

12. The optical disc recording method according to claim 11, further comprising:
storing, in a buffer memory, recording data to be recorded on the optical disc;
encoding the recording data read from the buffer memory; and
performing time axis correction on the encoded recording data.

13. The optical disc recording method according to claim 12, wherein Eight to Fourteen Modulation (EFM) is used to encode the recording data.

14. An optical disc recording method, comprising:
(a) irradiating a laser light onto an optical disc;
(b) performing focus servo for maintaining an approximately fixed distance between the optical disc and the optical pickup and outputting a signal showing whether the focus servo fails or not;
(c) moving an irradiating position of the optical pickup on the optical disc;
(d) controlling a laser power of the laser light in accordance with input data to be recorded;
(e) detecting whether the focus servo fails or not in accordance with the signal output at the step (b);
(f) obtaining a distance and an angle as a benchmark position, the distance being from an optical disc center to an irradiating position of the laser light, and the angle being between a baseline from the optical disc center to an outer periphery and a line from the optical disc center to the irradiating position, when a failure of the focus servo is detected at the step (e); and
(g) executing the step (d) to pause the control of the laser power in accordance with the data to be recorded and thereafter executing the step (c) and the step (d) to restart the control of the laser power in accordance with the data to be recorded from a position shifted by a predetermined moving amount from the benchmark position as a restarting position.

15. The optical disc recording method according to claim 14, further comprising:
storing, in a buffer memory, recording data to be recorded on the optical disc;
encoding the recording data read from the buffer memory; and
performing time axis correction on the encoded recording data.

16. The optical disc recording method according to claim 15, wherein Eight to Fourteen Modulation (EFM) is used to encode the recording data.

* * * * *